(12) United States Patent
Lee et al.

(10) Patent No.: US 12,727,971 B2
(45) Date of Patent: Sep. 8, 2026

(54) MAXILLARY SKELETAL EXPANDER AND MAXILLARY SKELETAL EXPANDING SYSTEM

(71) Applicant: OSTEONIC CO., LTD, Seoul (KR)

(72) Inventors: Dong Won Lee, Seoul (KR); Ui Shik Chung, Bucheon-si (KR); Young Hoon Kwon, Seoul (KR); Dong Uk Moon, Anyang-si (KR)

(73) Assignee: OSTEONIC CO., LTD, Seoul (KR)

( * ) Notice: Subject to any disclaimer, the term of this patent is extended or adjusted under 35 U.S.C. 154(b) by 398 days.

(21) Appl. No.: 18/128,877

(22) Filed: Mar. 30, 2023

(65) Prior Publication Data

US 2023/0310123 A1 Oct. 5, 2023

(30) Foreign Application Priority Data

Mar. 31, 2022 (KR) ........................ 10-2022-0040655

(51) Int. Cl.
*A61C 7/10* (2006.01)

(52) U.S. Cl.
CPC ..................................... *A61C 7/10* (2013.01)

(58) Field of Classification Search
CPC ........................................................ A61C 7/10
See application file for complete search history.

(56) References Cited

U.S. PATENT DOCUMENTS 5,472,344 A 12/1995 Binder et al.
5,564,920 A 10/1996 Klapper et al.
6,786,718 B2 * 9/2004 Lauren ..................... A61C 7/02 433/141
7,331,781 B1 * 2/2008 Bandeen ................. A61C 7/10 433/7
10,456,218 B1 10/2019 Mashouf
11,648,092 B2 * 5/2023 Moon ..................... A61C 7/10 433/7
2003/0013061 A1 1/2003 Lauren et al.
2004/0231472 A1 11/2004 Lin (Continued)

FOREIGN PATENT DOCUMENTS

CN 207693695 U 8/2018
CN 111655190 A 9/2020

(Continued)

OTHER PUBLICATIONS

Machine Translation of KR102076634. Accessed via Google Patents May 8, 2025 (Year: 2020).*

(Continued)

*Primary Examiner* — Edward Moran
(74) *Attorney, Agent, or Firm* — Crowell & Moring LLP

(57) ABSTRACT

Disclosed is a maxillary skeletal expander including: a first body coupled to a maxilla; a second body opposing the first body and coupled to the maxilla; a gap adjusting member with a first and second threaded portion provided on both sides of a main body part and respectively screwed to the first body and the second body; and an anti-rotation plate having an anti-rotation member having an elastic protrusion that protrudes toward the main body and fits into an anti-rotation recess provided along an edge of one side of the main body, so that unintentional rotation of the gap adjusting member is prevented.

15 Claims, 12 Drawing Sheets

(56) References Cited

U.S. PATENT DOCUMENTS

| | | | | |
|---|---|---|---|---|
| 2007/0074607 | A1 | 4/2007 | Balls | |
| 2009/0029309 | A1 | 1/2009 | Hanks | |
| 2010/0112507 | A1* | 5/2010 | Ehrenberger | A61C 7/10 433/7 |
| 2016/0270883 | A1 | 9/2016 | Yousefian | |
| 2020/0337808 | A1* | 10/2020 | Kim | A61C 7/10 |

FOREIGN PATENT DOCUMENTS

| | | | |
|---|---|---|---|
| IT | 2017 0003 2183 | A1 | 9/2018 |
| KR | 10-2076634 | B1 | 2/2020 |
| TW | 202200087 | A | 1/2022 |
| WO | WO 2018/117582 | A1 | 6/2018 |

OTHER PUBLICATIONS

Search Report issued in European Patent Application No. EP 23 164 471 dated Jul. 3, 2023 (2 pages).

Office Action issued in European Patent Application No. EP 23 164 471 dated Oct. 1, 2025 (6 pages).

* cited by examiner (a)

(b)

MAXILLARY SKELETAL EXPANDER AND MAXILLARY SKELETAL EXPANDING SYSTEM

BACKGROUND

Field

The present disclosure relates to a maxillary skeletal expander for orthodontic treatment of a maxilla, and a maxillary skeletal expanding system.

RELATED ART

In general, the jawbone consists of the maxilla and the mandible. The upper teeth connected to the maxilla and the lower teeth connected to the mandible are formed in the upper and lower parts of the jawbone. According to the movement of the temporomandibular joint, the upper and lower teeth interlock with each other to chew food.

For normal people, the maxilla is formed to protrude more forward than the mandible. However, there are cases where the maxilla is smaller than the mandible, resulting in malocclusion, where the teeth of the maxilla and the teeth of the mandible are aligned in reverse. When the malocclusion happens, orthodontic treatment is performed to expand the upper teeth of the maxilla as well as pull out the maxilla forward.

A maxillary skeletal expander is a device for orthodontic treatment of malocclusion patients in which the maxilla is less developed than the mandible. That is, the maxillary skeletal expander is a device for facilitating orthodontic treatment by expanding the maxilla.

A conventional maxillary skeletal expander is used to perform orthodontic treatment by rotating a gap adjusting member in a state where threaded portions on both sides of the gap adjusting member are screwed to both bodies to expand both bodies so that the bodies move away from each other.

However, in the conventional maxillary skeletal expander, both sides of the gap adjusting member are entirely threaded, so there is a problem that when the gap adjusting member is rotated, both bodies continue to expand, thereby escaping from the threaded portions on both sides. In addition, an anti-rotation member has relatively inferior functionality, the fixing strength of a screw to the maxilla is weak, and there is no dedicated tool to rotate the gap adjusting member by a desired number of clicks.

SUMMARY

The present disclosure provides a maxillary skeletal expander in which non-threaded portions are provided at ends of threaded portions on both sides of a gap adjusting member, thereby preventing escape of both bodies from both threaded portions and enhancing functionality of an anti-rotation member and fixing strength of a screw implanted in the maxilla.

The present disclosure also provides a maxillary skeletal expanding system including a maxillary skeletal expander and a dedicated tool capable of rotating a gap adjustment member by a set number of clicks.

In an aspect, a maxillary skeletal expander includes: a first body coupled to a maxilla; a second body opposing the first body and coupled to the maxilla; a gap adjusting member with a first and second threaded portion provided on both sides of a main body part and respectively screwed to the first body and the second body; and an anti-rotation plate having an anti-rotation member having an elastic protrusion that protrudes toward the main body and fits into an anti-rotation recess provided along an edge of one side of the main body, so that unintentional rotation of the gap adjusting member is prevented.

In addition, an outer surface of the elastic protrusion may be formed in a semicircular shape corresponding to a shape of the anti-rotation recess so as to be inserted into the anti-rotation recess.

In addition, non-threaded portions may be respectively provided at an end of the first threaded portion and an end of the second threaded portion.

In addition, the first body or the second body may be coupled to the maxilla by a pair of first and second fixing members, and the first fixing member and the second fixing member may be obliquely implanted in the maxilla in a manner in which the first fixing member and the second fixing member are implanted in a cross direction intersecting an expansion direction to be close to a central portion of the maxilla to pass through both sides of the first body or both sides of the second body so that the first fixing member and the second fixing member become spaced apart from each other downwards.

In addition, a pair of a first guide member and a second guide member may be coupled to both sides of the first body or both sides of the second body, a first through hole through which the first fixing member is coupled may be provided in the first guide member, and a second through-hole through which the second fixing member is coupled may be provided in the second guide member.

In addition, the first through hole and the second through hole may be configured as slant holes for guiding slant implantation of the first fixing member and the second fixing member.

In addition, a first guide pin and a second guide pin may be coupled to the first body and the second body so as to pass through side surfaces of the first body and the second body, and the first body and the second body may be movable along the first guide pin and the second guide pin.

In addition, arms may be coupled to an outer side of the first body and an outer side of the second body, and each of the arms may be positioned between the first guide pin and the second guide pin and fixed to a tooth of the maxilla.

In addition, the anti-rotation plate may be assembled in a manner in which an assembly space provided in one surface of the anti-rotation plate surrounds a first coupling part provided between the main body and the second threaded portion, while both ends of the anti-rotation plate are inserted into coupling grooves provided in the first guide pin and the second guide pin. The anti-rotation member may have a coupling space corresponding to the assembly space of the anti-rotation plate, and the coupling space is assembled to surround the first coupling part.

In addition, a second coupling part may be provided between the main body and the first threaded portion, a support plate opposing the anti-rotation plate may be provided, the support plate may have an assembly space, and the assembly space of the support plate may be assembled to surround the second coupling part while ends of both sides thereof are inserted into the coupling grooves of the first guide pin and the second guide pin.

In another aspect, a maxillary skeletal expander includes: a first body coupled to a maxilla; a second body opposing the first body and coupled to the maxilla; a gap adjusting member with a first and second threaded portion provided on both sides of a main body part and respectively screwed to the first body and the second body; and an anti-rotation plate provided on both sides of the main body and having an anti-rotation member having an elastic protrusion that protrudes toward the main body and is inserted into an anti-rotation recess provided along edges of both sides of the main body, so that unintentional rotation of the gap adjusting member is prevented.

In yet another aspect, a maxillary skeletal expanding system includes: the maxillary skeletal expander; and a tool for rotating a gap adjusting member of the maxillary skeletal expander to expand in an expansion direction so that a first body and a second body move away from each other.

In addition, the tool may include: a handle part; and a tool part that includes a support part coupled to an assembly end provided on one side of the handle part by a hinge member, an extension part extending from the support part, and an insertion part provided at an end of the extension part and coupled to a prismatically structured main body provided in the gap adjusting member.

In addition, a first assembly, into which the support part is inserted, and a second assembly, into which the extension part is inserted while communicating with the first assembly, may be provided in one surface of the assembly end part, and the second assembly may restrict rotation of the extension part.

In addition, the second assembly may include a first stopper and a second stopper, and the extension part may be limited to rotating at 60 degrees by the first stopper and the second stopper.

In addition, the hinge member may include: a head provided with an accommodation therein; and a hinge shaft extending from the accommodation and having an assembly recess at an outer periphery of an end thereof.

In addition, an elastic body in contact with the support part may be inserted into the accommodation, an end of the hinge shaft may be coupled through the elastic body, the support part, and the assembly end, sequentially, and a stop ring may be coupled to the assembly recess.

In the present disclosure, as the expansion of the first body and the second body is limited by the non-threaded portions at the ends of the first threaded portion and the second threaded portions, it is possible to prevent a problem that the first body and the second body expands beyond a maximum expansion range to escape from the first threaded portion and the second threaded portion and thus disassembled.

In addition, in the present disclosure, as the anti-rotation member is provided in the anti-rotation plate and the elastic protrusion of the anti-rotation member fits into an anti-rotation recess of the main body, it is possible to prevent unintentional rotation of the gap adjusting member.

In addition, in the present disclosure, the first fixing member and the second fixing member are obliquely implanted in the maxilla in such a way that implants the first fixing member and the second fixing in a crossing direction intersecting an expansion direction close to the center of the maxilla to pass through both sides of the first and second bodies so that the first fixing member and the second fixing member become further spaced apart from each other downwards, and therefore, it is possible to enhance fixation to the maxilla.

In addition, in the present disclosure, it is possible for a patient to easily, accurately, and reliably rotate the gap adjusting member by a desired number of clicks by using a dedicated tool optimized for the maxillary skeletal expander.

DESCRIPTION OF EXEMPLARY EMBODIMENTS

Figure 1:
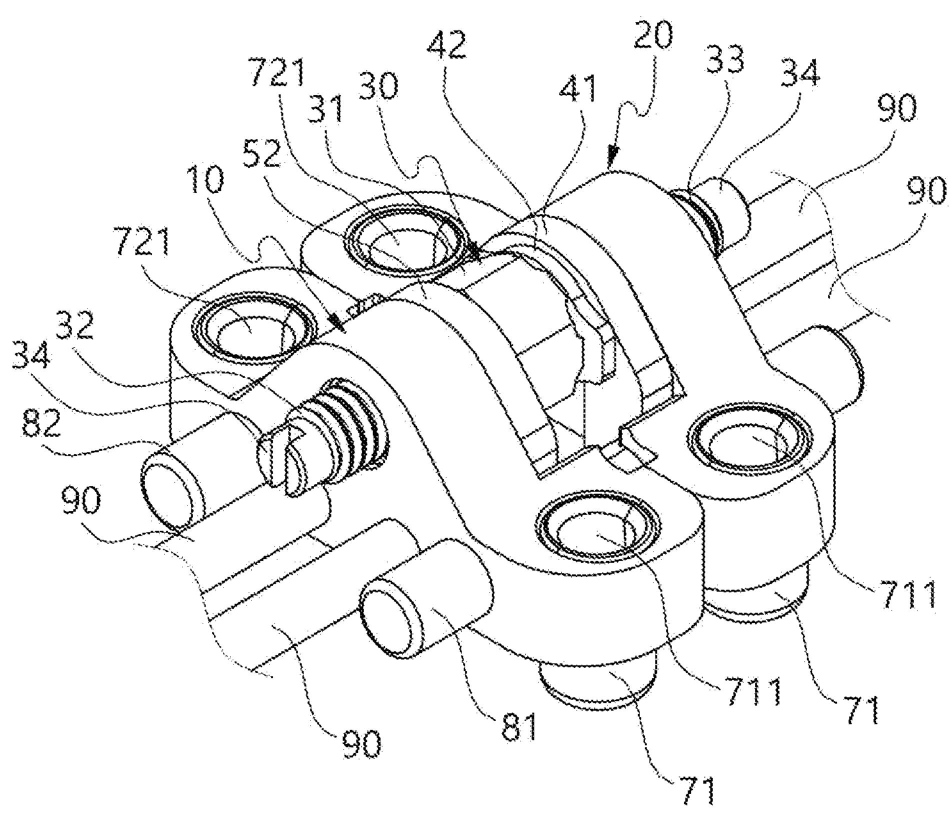
FIG. 1 is a perspective view of a maxillary skeletal expander according to an embodiment of the present disclosure.

Hereinafter, embodiments of the present disclosure will be described in detail with reference to the accompanying drawings. It should be understood that, in applying reference numerals to constituents of each drawing, although the same elements are shown on different drawings, they may be denoted by the same reference numbers. In describing the present disclosure, if a detailed explanation for a related known function or construction is considered to unnecessarily divert the gist of the present disclosure, an explanation thereof will be omitted but would be understood by those skilled in the art. In addition, an exemplary embodiment of the present disclosure will be described below, but the technical spirit of the present disclosure is not limited thereto and the embodiment may be modified and variously implemented by those skilled in the art.

Figure 2:
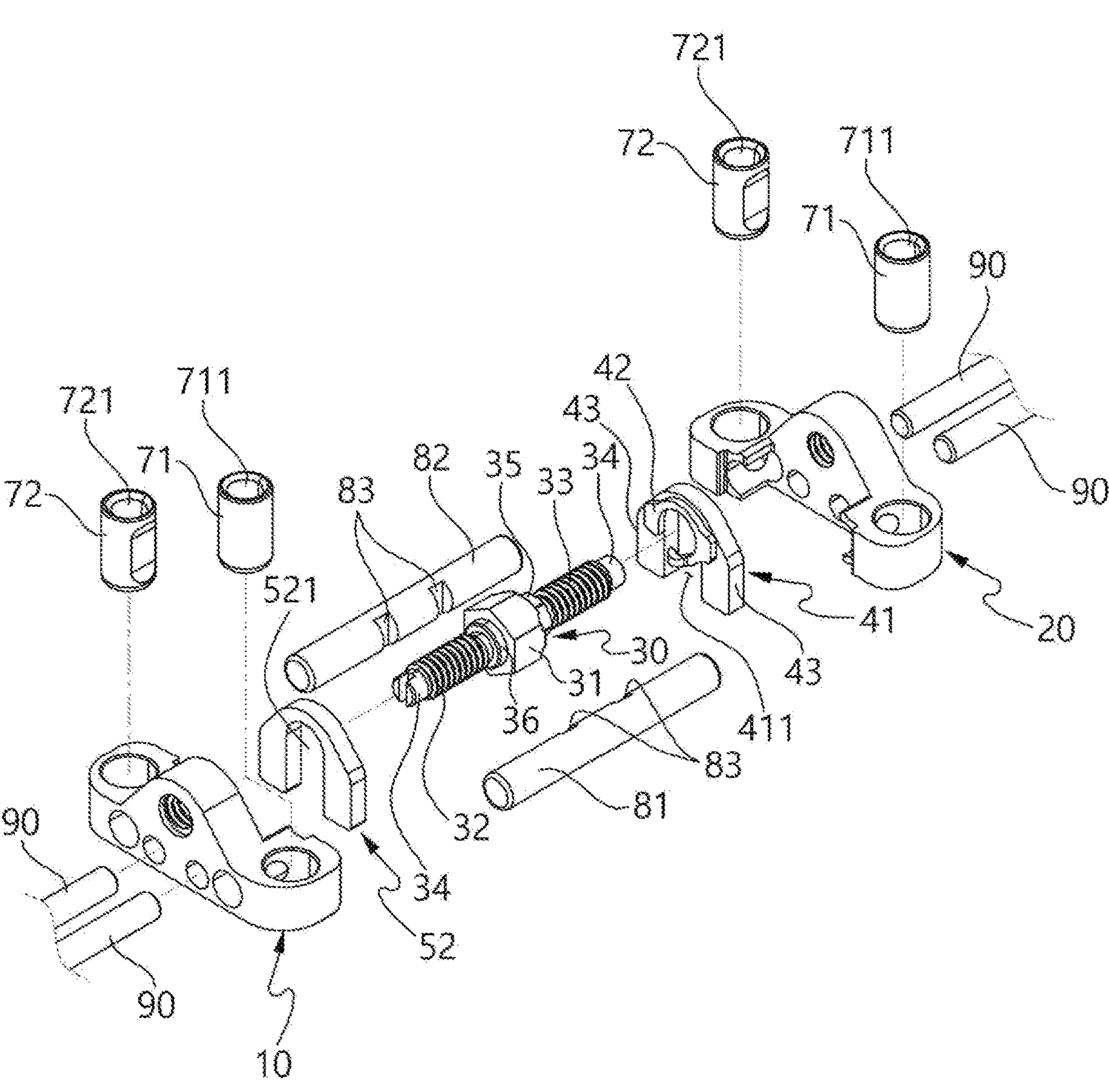
FIG. 2 is an exploded perspective view of a maxillary skeletal expander according to an embodiment of the present disclosure.
Figure 3:
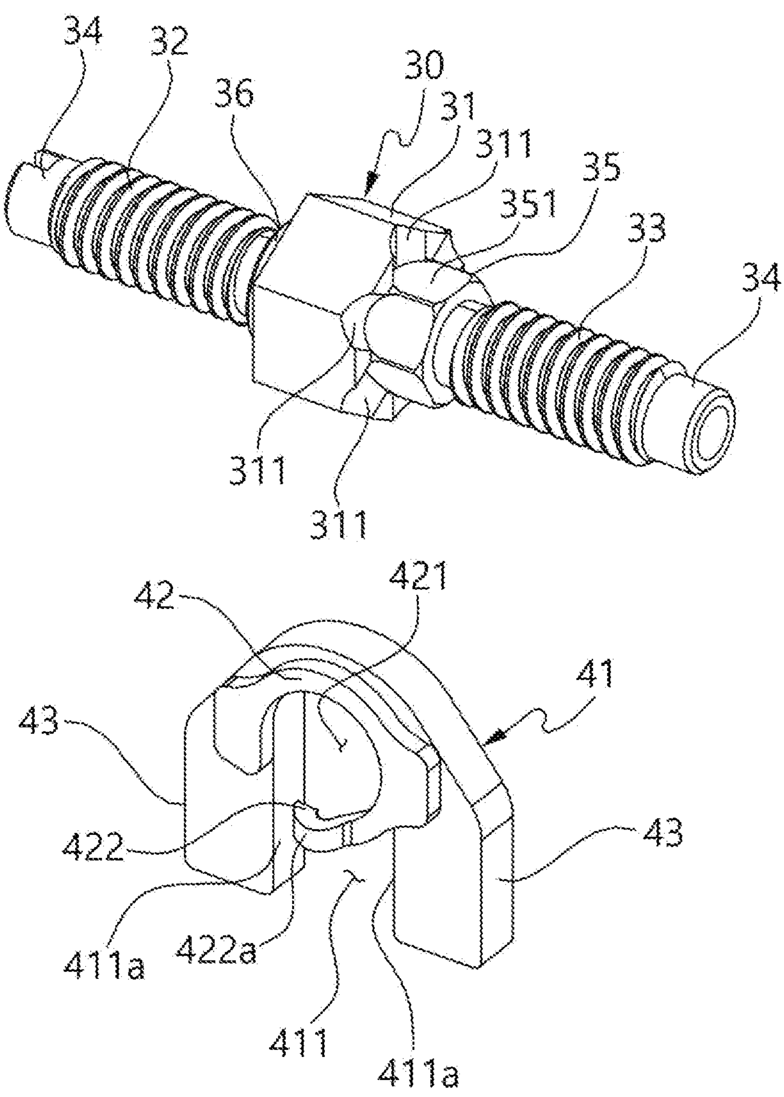
FIG. 3 is a view showing an anti-rotation plate according to an embodiment of the present disclosure.

FIG. 1 is a perspective view of a maxillary skeletal expander according to an embodiment of the present disclosure, FIG. 2 is an exploded perspective view of a maxillary skeletal expander according to an embodiment of the present disclosure, and FIG. 3 is a view showing the anti-rotation plate according to an exemplary embodiment of the present disclosure.

As shown in FIGS. 1 to 3, the present disclosure includes a first and second body 10 and 20 coupled to the maxilla M, and a first and second threaded portion 32 and 33 provided on both side of a main body 31. The first threaded portion 32 is screwed to the first body 10, and the second threaded portion 33 includes a gap adjusting member 30 screwed to the second body 20 and an anti-rotation plate 41 having an anti-rotation member 42 facing the main body 31.

For example, the anti-rotation plate 41 having the anti-rotation member 42 may be provided on one side or both sides of the main body 31, and an anti-rotation recess 311 into which an elastic protrusion 422 of the anti-rotation member 42 is inserted may be provided on one side or both sides of the main body 31.

The first body 10 may be coupled to the maxilla M by a pair of first fixing members 61 and second fixing members 62 passing through both ends of the first body 10.

The second body 20 may be coupled to the maxilla M by a pair of first fixing members 61 and second fixing members 62 passing through both ends opposite to the first body 10.

The main body 31 may have a prismatic structure. For example, the main body 31 may have a prismatic structure, such as a hexagon, in which the tool 100 can be engaged. The anti-rotation recess 311 may be provided along an edge of one side of the main body 31 facing the second threaded portion 33. For example, the anti-rotation recess 311 may be provided at intervals of 60 degrees.

A non-threaded portion 34 may be formed at the end of the first threaded portion 32 and the end of the second threaded portion 33.

When the gap adjusting member 30 is rotated, the first body 10 may move in an expansion direction D1 along the thread of the first threaded portion 32, and then disengaged from the first threaded portion 32 at the non-threaded portion 34, thereby unable to expand any longer in the expansion direction D1. In this state, even if the gap adjusting member 30 is further rotated, the first threaded portion 32 only idles with the non-threaded portion 34 inserted into the first body 10.

When the gap adjusting member 30 is rotated, the second body 20 may move in the expansion direction D1 along the thread of the second threaded portion 33 like the first body 10, and then disengaged from the second threaded portion 33 at the non-threaded portion 34, thereby unable to expand any longer in the expansion direction D1. In this state, even if the gap adjusting member 30 is further rotated, the second threaded portion 33 only idles with the non-threaded portion 34 inserted into the second body 20.

Preferably, the first threaded portion 32 and the second threaded portion 33 are configured as different threads so as to move the first body 10 and the second body 20 in the expansion direction D1.

For example, when the first threaded portion 32 is a right-screw, the second threaded portion 33 is preferably a left-screw, and when the first threaded portion 32 is a left-screw, the second threaded portion 33 is preferably a right-screw.

Figure 4:
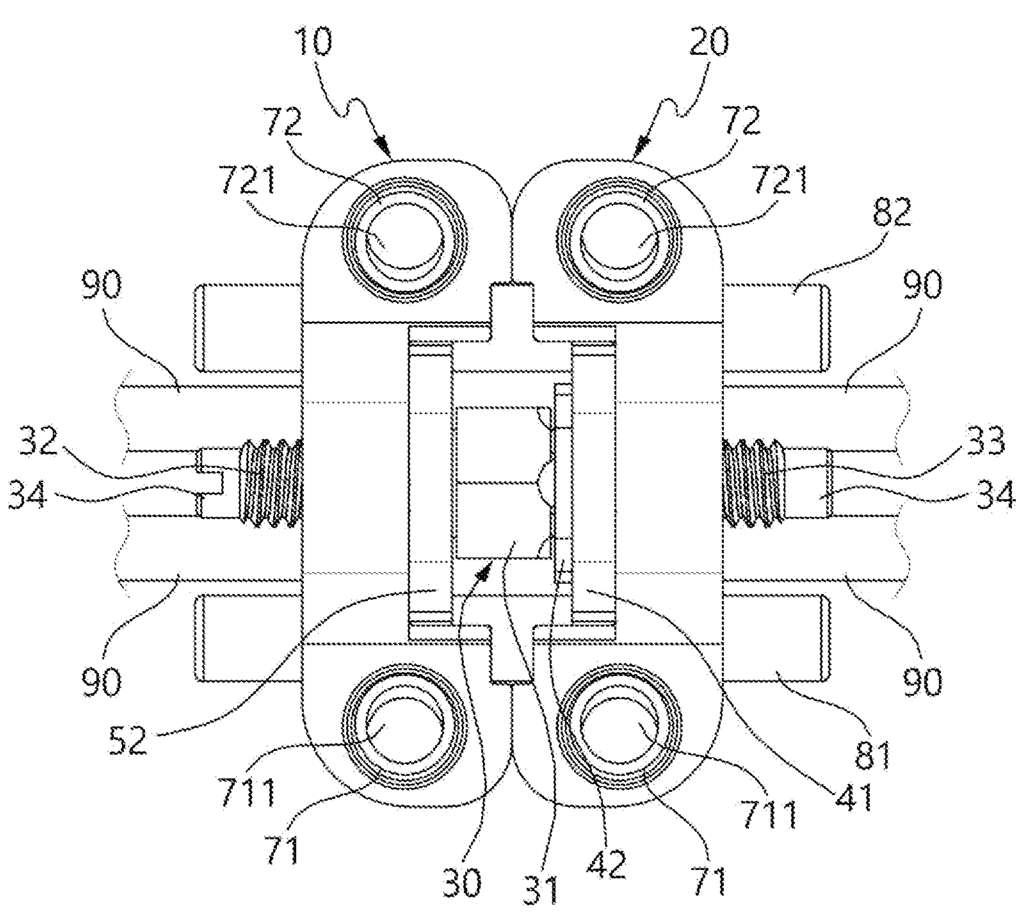
FIG. 4 is a plan view of a maxillary skeletal expander according to an embodiment of the present disclosure, which shows a non-expanded state of the maxillary skeletal expander.
Figure 5:
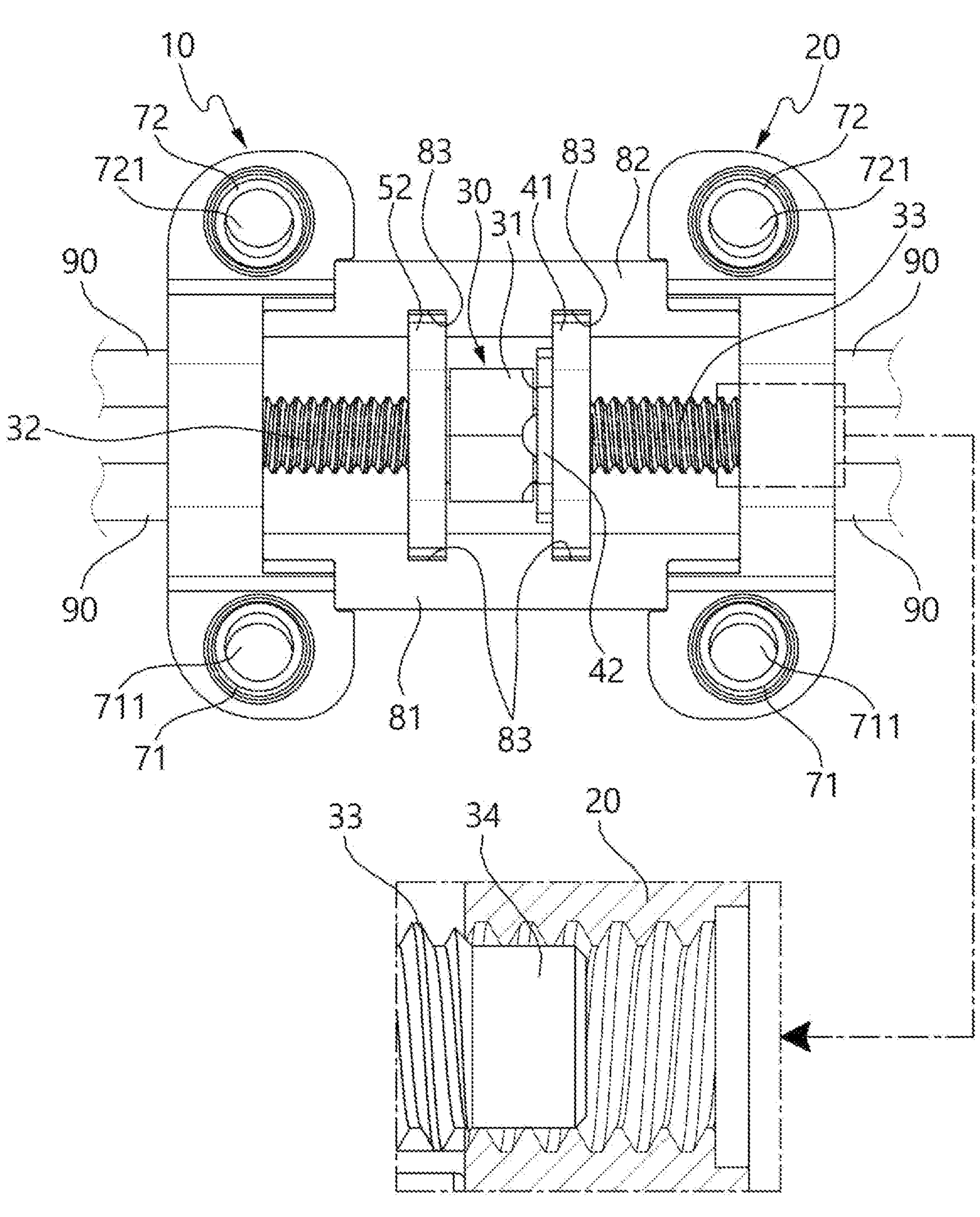
FIG. 5 is a plan view of a maxillary skeletal expander according to an embodiment of the present disclosure, which shows an expanded state of the maxillary skeletal expander.

FIG. 4 is a plan view of a maxillary skeletal expander according to an embodiment of the present disclosure, which shows a pre-expansion state of the maxillary skeletal expander, and FIG. 5 is a plan view of a maxillary skeletal expander according to an embodiment of the present disclosure, which shows an expansion state of the maxillary skeletal expander.

As shown in FIGS. 4 and 5, a first coupling part 35 is provided between the main body 31 of the gap adjusting member 30 and the second threaded portion 33, and the anti-rotation plate 41 is coupled to the first coupling part 35.

The anti-rotation plate 41 includes the anti-rotation member 42. The anti-rotation member 42 may be provided at one surface of the anti-rotation plate 41 facing the anti-rotation recess 311 of the main body 31.

The anti-rotation plate 41 stably supports the anti-rotation member 42, and also serves as a spacer to enable a first guide pin 81 and a second guide pin 82 to maintain a predetermined distance therebetween.

For example, the anti-rotation member 42 may be integrally formed with the anti-rotation plate 41 or may be detachable from the anti-rotation plate 41.

Since a width between the first guide pin 81 and the second guide pin 82 is greater than a horizontal width of the anti-rotation member 42, it is not possible to couple the anti-rotation member 42 directly to the first guide pin 81 and the second guide pin 82. In order to address this drawback, the anti-rotation member 42 is formed integrally with one surface of the anti-rotation plate 41, and the anti-rotation plate 41 larger than the anti-rotation member 42 is coupled to be positioned between the first guide pin 81 and the second guide pin 82.

The anti-rotation member 42 includes the elastic protrusion 422. The elastic protrusion 422 protrudes toward the main body 31. The elastic protrusion 422 fits into an anti-rotation recess 311 of the main body 31 to prevent unintentional rotation of the gap adjusting member 30.

The anti-rotation plate 41 has an assembly space 411. The assembly space 411 is coupled to the first coupling part 35. During an assembly process, the anti-rotation plate 41 is assembled such that the assembly space 411 surrounds the first coupling part 35 and both ends 43 of the anti-rotation plate 41 are inserted into coupling grooves 83 provided on surfaces where the first guide pin 81 and the second guide pin 82 face each other.

For example, the assembly space 411 of the anti-rotation plate 41 may be configured in a shape such as "∩" with an open bottom. The assembly may be assembled in such a way that the first coupling part 35 is inserted into the assembly space 411 through the bottom of the assembly space 411.

Preferably, a sufficient width is formed between inner wall surfaces 411*a* of both sides of the assembly space 411, so that an outer periphery of the assembly space 411 does not come into contact with a prismatic surface 351 of the first coupling part 35 during rotation of the first coupling part 35.

The anti-rotation member 42 has a coupling space 421 corresponding to the assembly space 411 of the anti-rotation plate 41. The elastic protrusion 422 of the anti-rotation member 42 is preferably located at the center of the coupling hole 421 so as to match the position of the anti-rotation recess 311 of the main body 31.

An outer surface 422*a* of the elastic protrusion 422 of the anti-rotation member 42 is preferably formed in a shape corresponding to the anti-rotation recess 311 so as to be inserted into the anti-rotation recess 311.

For example, in order to have elasticity, the elastic protruding portion 422 may be configured in a semicircular shape convex in a direction toward the main body 31 by bending an end inwardly.

When a force greater than a supporting force of the elastic protrusion 422 is applied to the gap adjusting member 30, the gap adjusting member 30 may be rotate by overcoming the supporting force of the elastic protruding part 422.

The main body 31 is rotated by the rotation of the gap adjusting member 30, and upon the rotation of the main body 31, the elastic protrusion 422 fitted into an anti-rotation recess 311 of the main body 31 may fit into another anti-rotation recess 311 provided in the main body 31.

Figure 6A:
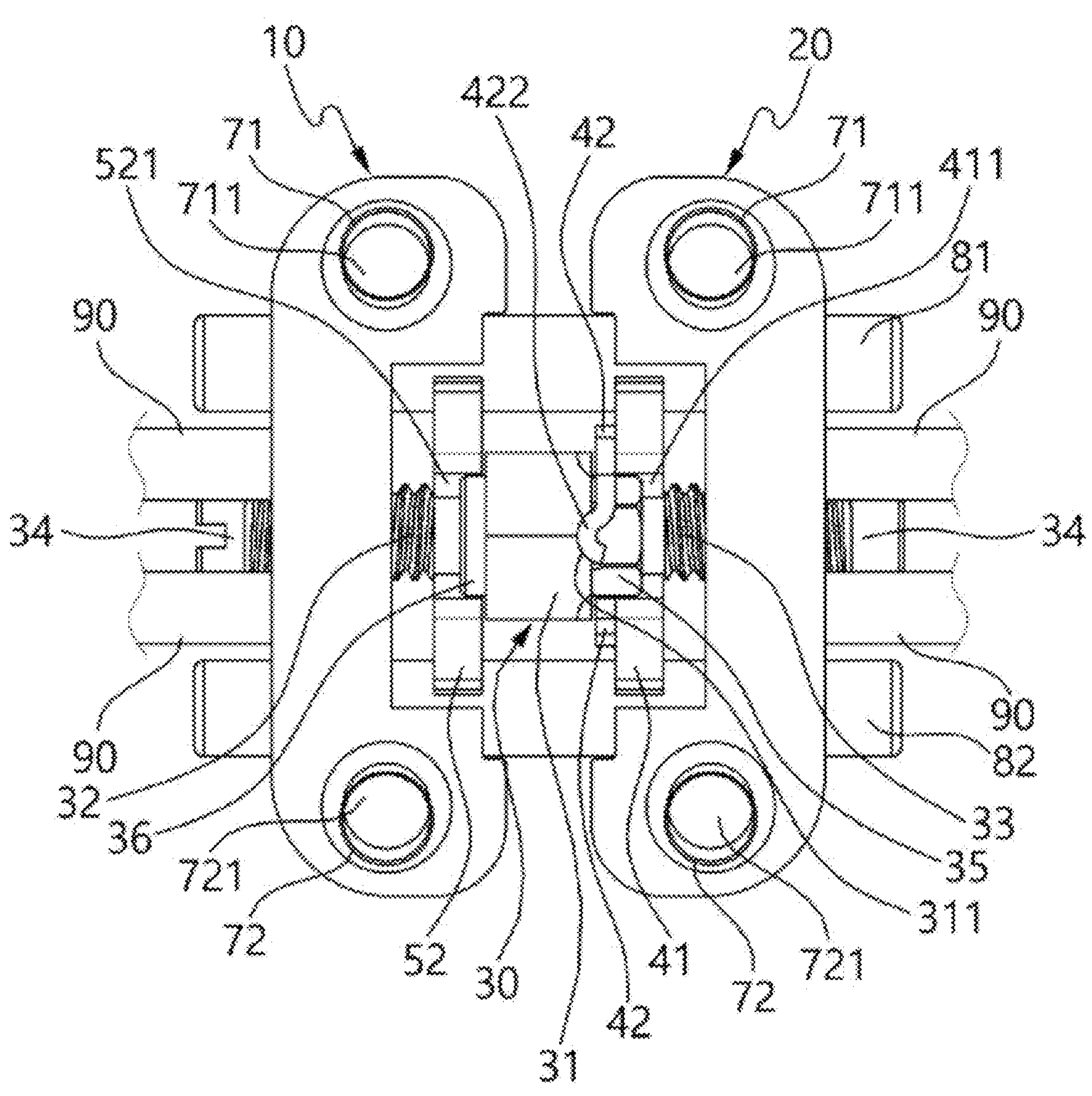
FIG. 6A is a bottom view of a maxillary skeletal expander, which shows an assembled state of an anti-rotation plate formed on a single side of the main body according to an embodiment of the present disclosure.
Figure 6B:
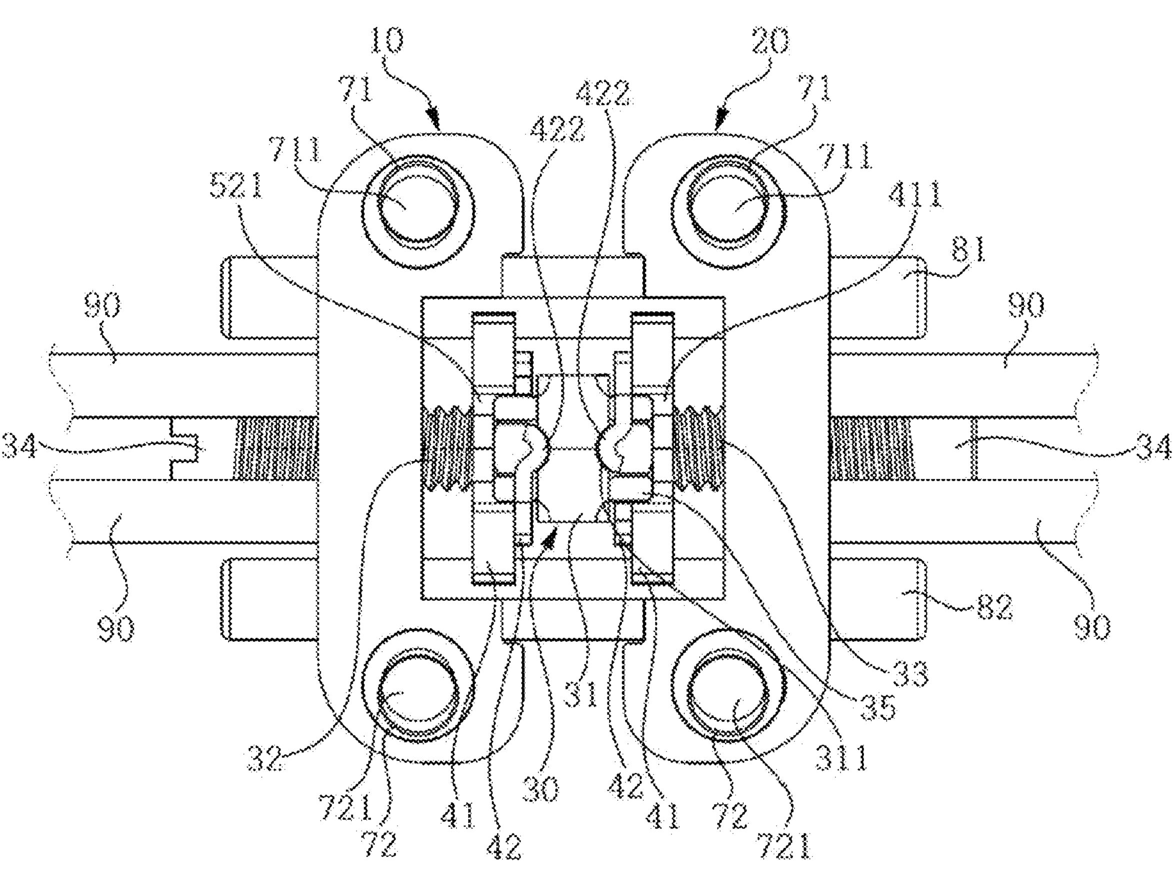
FIG. 6B is a bottom view of a maxillary skeletal expander, which shows an assembled state of anti-rotation plates formed on both sides of the main body according to an embodiment of the present disclosure.
Figure 7:
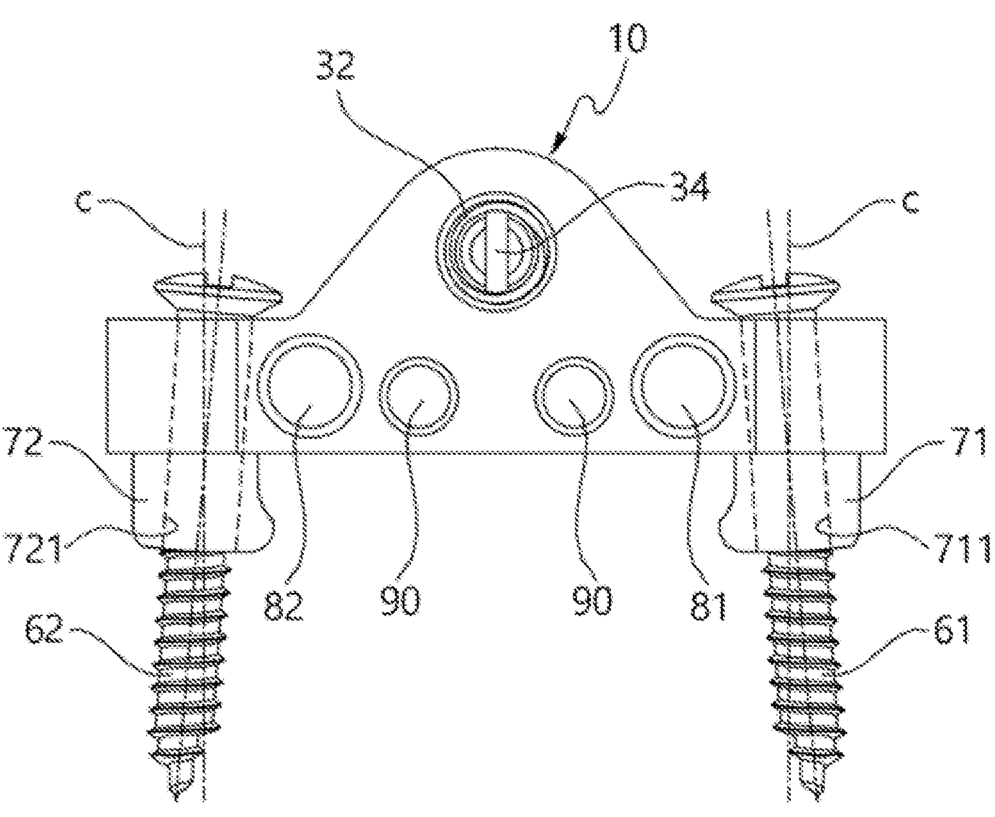
FIG. 7 is a side view showing a state in which a first fixing member and a second fixing member are coupled through both ends of a first body according to an embodiment of the present disclosure.
Figure 8:
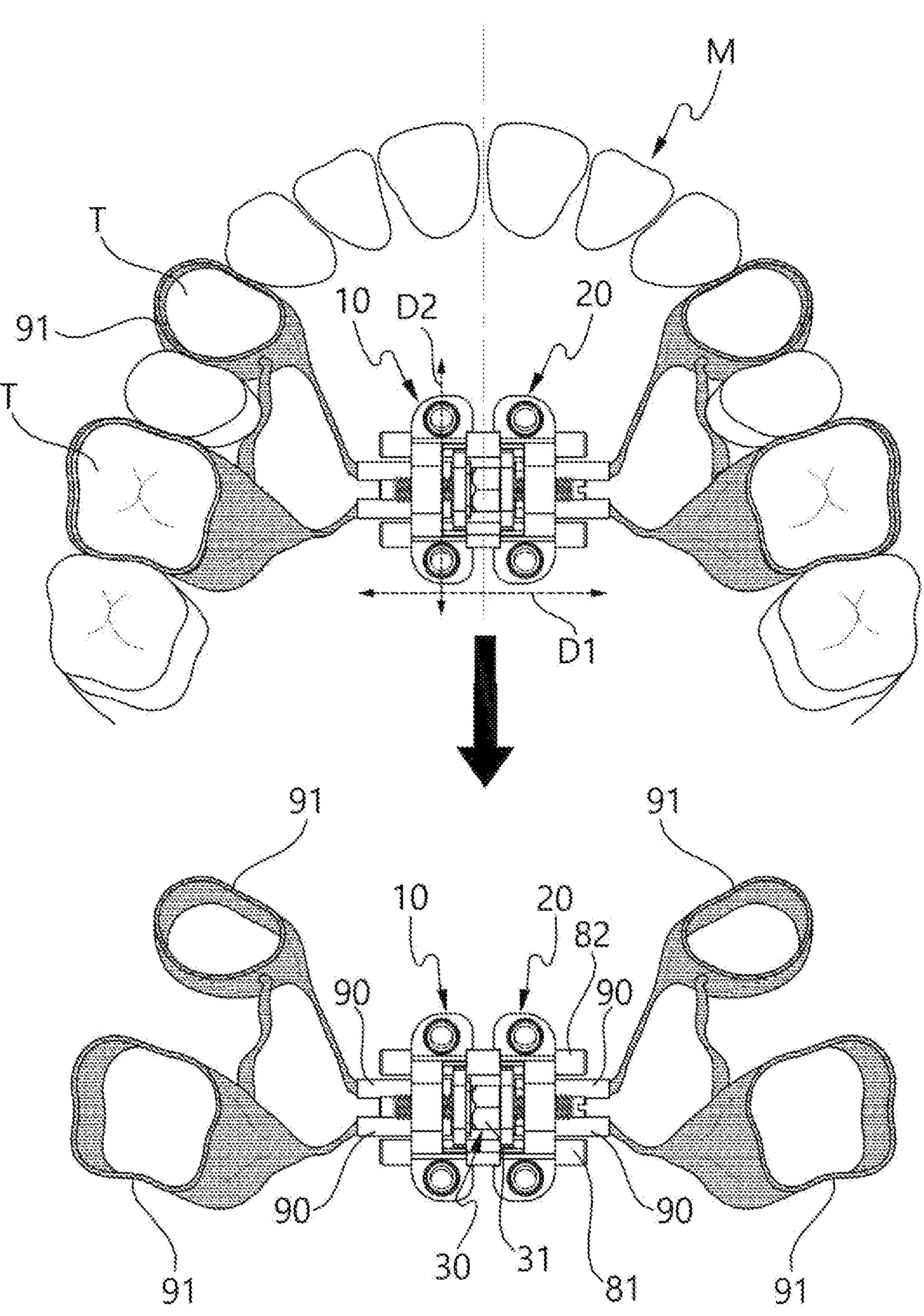
FIG. 8 is a view showing a state in which a maxillary skeletal expander according to an embodiment of the present disclosure is coupled to the maxilla.

FIGS. 6A and 6B are a bottom view of a maxillary skeletal expander according to an exemplary embodiment of the present disclosure, which show an assembled state of the anti-rotation plate; FIG. 7 is a side view showing a state in which a first fixing member and a second fixing member are coupled through both ends of a first body; and FIG. 8 is a view showing a state in which a maxillary skeletal expander according to an embodiment of the present disclosure is coupled 25 to the maxilla.

As shown in FIGS. 6A, 6B, 7 and 8, in order to be implanted in the cross direction D2 intersecting the expansion direction D1 in the maxilla M, a pair of first and second fixing members 61 and 62 may be obliquely implanted through both sides of the first body 10 or both sides of the second body 20 to be spaced further away from each other downwards.

For example, the first fixing member 61 and the second fixing member 62 may be Mini screws that can be implanted into the maxilla M.

Since the bone of the maxilla M is weaker in strength and thinner than bones in other parts of the body, fixing positions or directions of the fixing member 62 of the second fixing member 62 are very important to maintain the fixing strength of the first fixing member 61 and the second fixing member 62.

The thickness of the bone of the maxilla M is structurally the great at a portion near the center of the maxilla M (mid-palatal suture), and rapidly becomes thinner in a direction away from the center of the maxilla M, that is, in the expansion direction (D1). Thus, in order to maximize the fixing strength of the first fixing member 61 and the second fixing member 62, it is preferable to fix the first fixing member 61 and the second fixing member 62 at positions close to the center of the maxilla M.

Therefore, implanting the first fixing member 61 and the second fixing member 62 on the line of a cross direction D2 close to the center of the maxilla M may increase the fixing strength. In addition, implanting the first fixing member 61 and the second fixing member 62 obliquely to a central axis X so as to be spaced further away from each other downwards may increase the fixing strength compared to a case of implanting the first fixing member 61 and the second fixing member 62 vertically.

A pair of a first guide member 71 and a second guide member 72 may be coupled to both sides of the first body 10. The first guide member 71 and the second guide member 72 form a symmetrical structure. The first guide member 71 and the second guide member 72 may also be coupled to both sides of the second body 20.

A first through hole 711 through which the first fixing member 61 is coupled to the first guide member 71 may be provided. A second through hole 721 through which the second fixing member 62 is coupled to the second guide member 72 may be provided.

The first through hole 711 and the second through hole 721 may be configured as slant holes that guide the slant implantation of the first fixing member 61 and the second fixing member 62.

The first guide pin 81 and the second guide pin 82 may be coupled to the first body 10 and the second body 20 in a way of passing through the side surfaces of the first body 10 and the second body 20. For example, the first guide pin 81 and the second guide pin 82 may be configured in a round bar shape.

The first body 10 and the second body 20 may stably move in the expansion direction D1 along the first guide pin 81 and the second guide pin 82.

Arms 90 may be coupled to outer surfaces of the first body 10 and the second body 20. The arms 90 are positioned between the first guide pin 81 and the second guide pin 82. The arms 90 may be connected to a tooth coupling member 91 to be fixed to a tooth T of the maxilla M. For example, the tooth coupling member 91 may be a band that can be fixed to a tooth T of the maxilla M.

Each arm 90 may have a smaller outer diameter than that of the first guide pin 81 and the second guide pin 82.

A second coupling part 36 may be provided between the main body 31 of the gap adjusting member 30 and the first threaded portion 32. A support plate 52 opposing the anti-rotation plate 41 may be assembled to the second coupling part 36.

Together with the anti-rotation plate 41, the support plate 52 may serve as a spacer for maintaining a distance between the first guide pin 81 and the second guide pin 82.

An assembly space 521 such as the anti-rotation plate 41 may be provided in the support plate 52. The assembly space 521 of the support plate 52 is assembled to surround the second coupling part 36.

Like the anti-rotation plate 41, both ends of the support plate 52 may be coupled to the coupling grooves 83 provided in the first guide pin 81 and the second guide pin 82.

Figure 9:
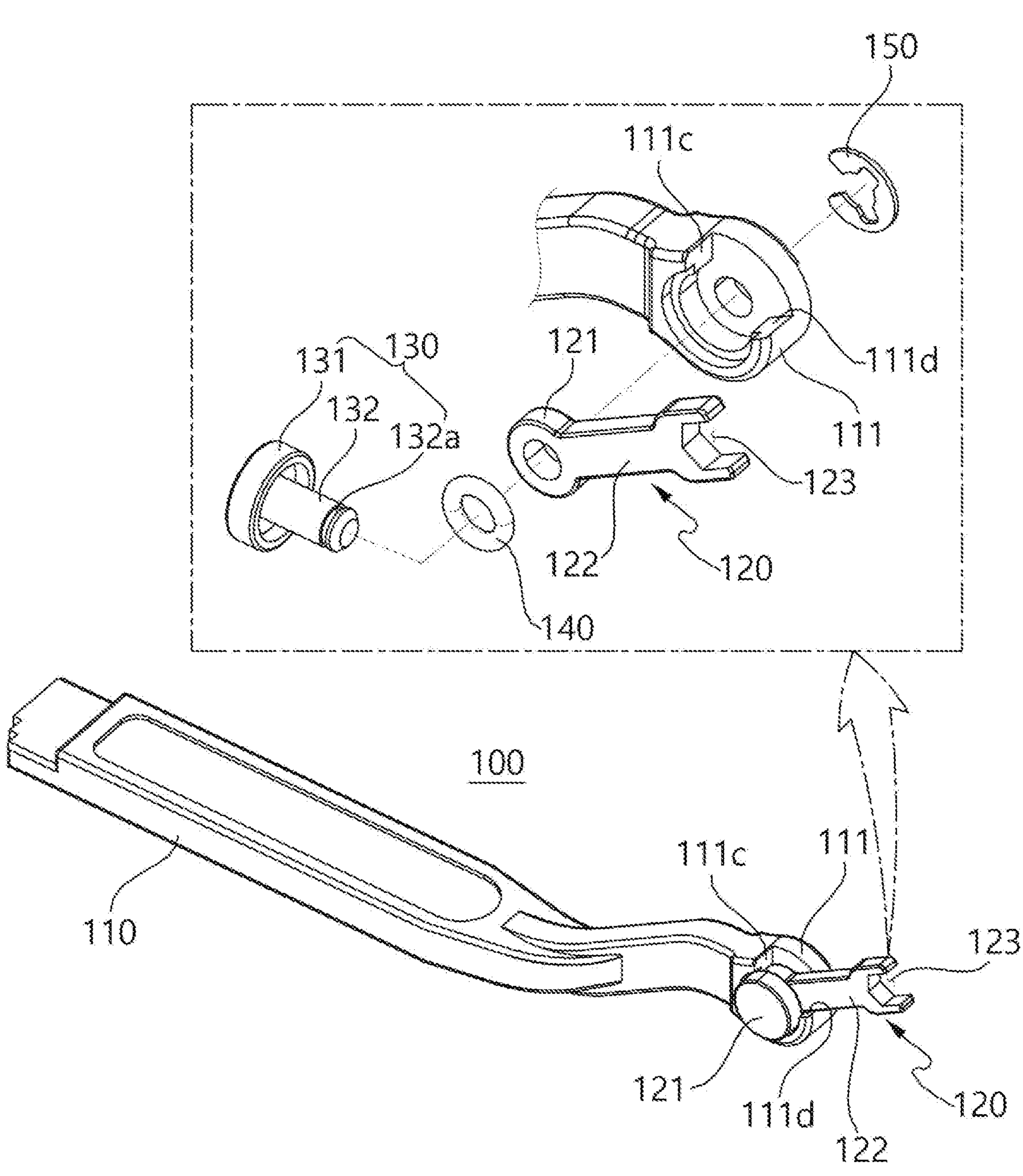
FIG. 9 is a view showing a dedicated tool for rotating a gap adjusting member according to an embodiment of the present disclosure.
Figure 10:
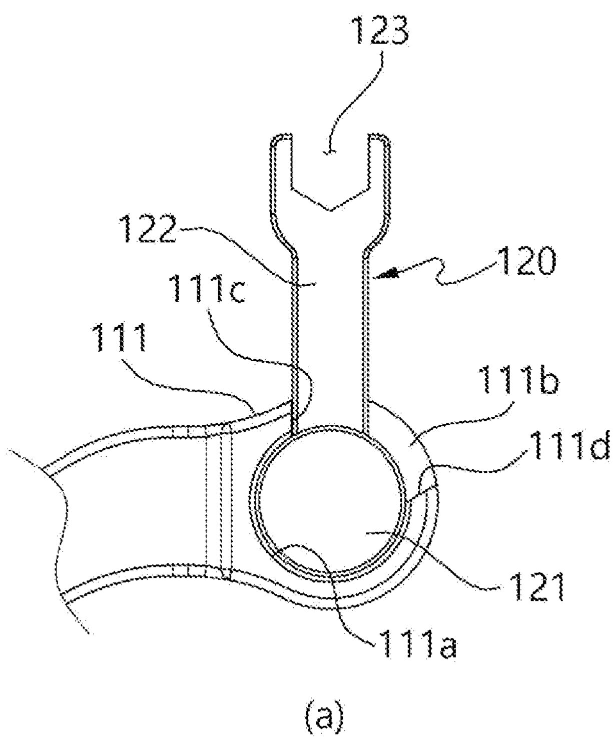
FIG. 10 is a diagram showing the operation of a tool part of a dedicated tool according to an embodiment of the present disclosure.
Figure 10:
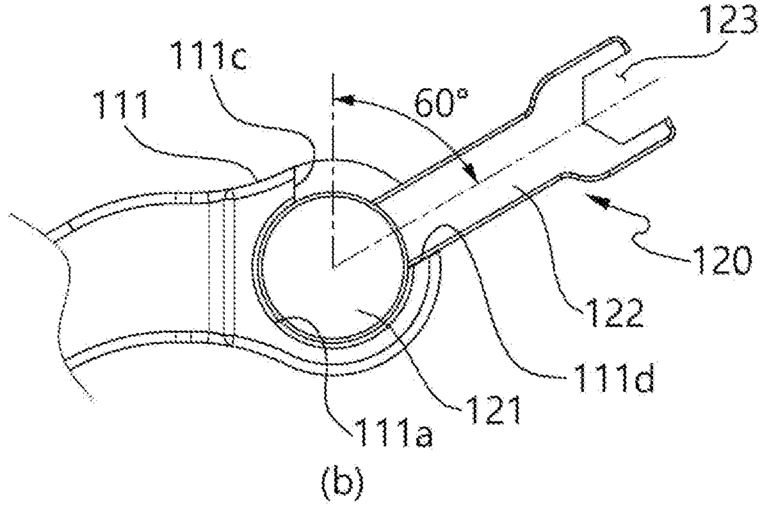

FIG. 9 is a view showing a dedicated tool for rotating a gap adjusting member according to an embodiment of the present disclosure; FIG. 10 is a view showing operation of a tool part of the dedicated tool according to an embodiment of the present disclosure; and FIG. 11 is a view showing a rotation process of a gap adjusting member by a dedicated tool according to an embodiment of the present disclosure.

Figure 11:
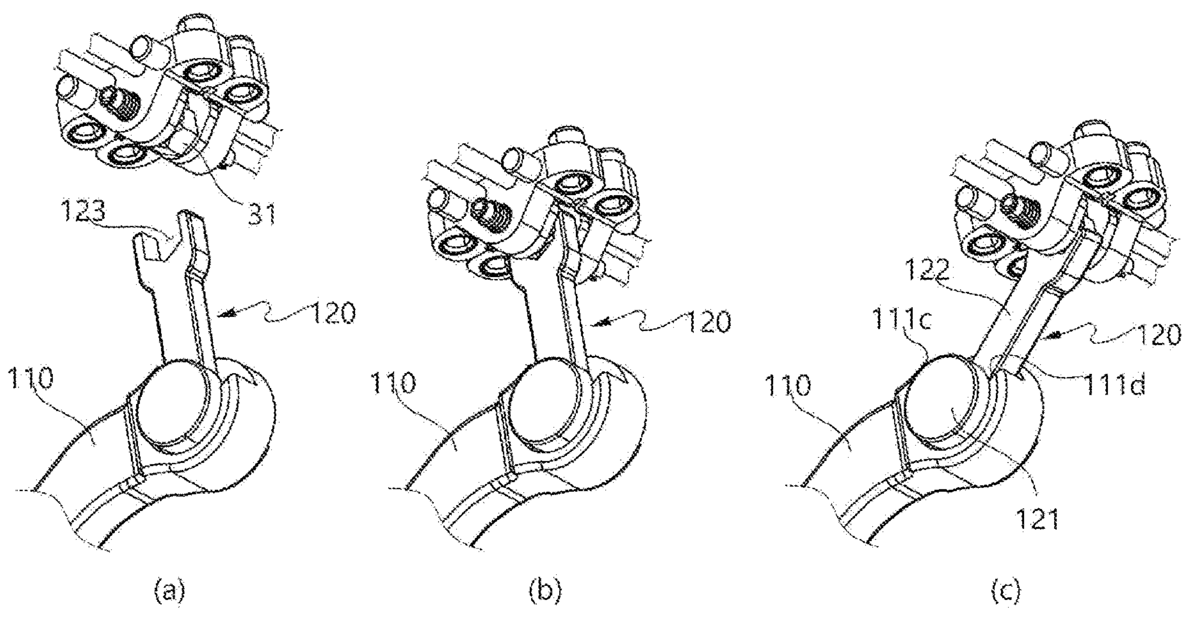
FIG. 11 is a view showing a rotation process of a gap adjusting member by a dedicated tool according to an embodiment of the present disclosure.

As shown in FIGS. 9 to 11, a maxillary skeletal expanding system of the present disclosure includes a tool 100 that rotates the maxillary skeletal expander and the gap adjusting member 30 thereof so that the first body 10 and the second body 20 expand in the expansion direction D1 so as to move away from each other.

The tool 100 includes a handle part 110, and a tool part 120 connected to the handle part 110 by a hinge member 130. The tool part 120 includes a support part 121, an extension part 122 extending from the support part 121, and an insertion part 123 provided at an end of the extension part 122.

The support part 121 is coupled to an assembly end 111 of one side of the handle part 110. A first assembly 111*a* and a second assembly 111*b* communicating with the first assembly 111*a* are provided at one surface of the assembly end 111.

The support part 121 is inserted into the first assembly 111*a*. It is preferable that the support part 121 is configured in a circular shape corresponding to that of the first assembly 111*a* so that rotation can be made smoothly. The first assembly 111*a* may provide a space in which the support part 121 can operate.

The extension part 122 is inserted into the second assembly 111*b*. The second assembly 111*b* may limit the rotation of the extension part 122.

The second assembly 111*b* includes a first stopper 111*c* and a second stopper 111*d*. Rotation of the extension part 122 may be restricted to 60 degrees by the first stopper 111*c* and the second stopper 111*d*.

The hinge member 130 includes a head 131 having an accommodation 131*a* therein, and a hinge shaft 132 extending from the accommodation 131*a*. An assembly recess 132*a* is provided at an outer periphery of an end of the hinge shaft 132.

An elastic body 140 may be inserted into the accommodation 131*a* of the head 131. In an assembled state, the elastic body 140 may be elastically in close contact with the support part 121, preventing loosening of the assembled state of the support part 121.

For example, the elastic body 140 may be a spring or any material as long as it can elastically and tightly support the support part 121.

The elastic body 140 prevents the assembly structure of the tool part 120 from being loose due to frequent use of the tool 100, so that a rotational force of the tool part 120 is always smoothly transmitted to the main body 31 of the gap adjusting member 30.

An end of the hinge shaft 132 is coupled through the elastic body 140, the support part 121, and the assembly end part 111, sequentially. A stop ring 150 is coupled to the assembly recess 132*a* of the hinge shaft 132, which is exposed when coupled to the assembly end 111, so that the hinge shaft 132 is prevented from being separated from the assembly end 111.

For the tool 100 of the present disclosure, the tool part 120 for transferring a rotational force to the gap adjusting member 30 is rotated at a predetermined angle, that is, at 60 degrees per click, and thus, even if a patient rotates the gap adjusting member 30 by himself or herself, it is possible to rotate the gap adjusting member 30 exactly by a number of clicks. Accordingly, the patient may use the tool 100 without feeling nervous to expand the first body 10 and the second body 10 by rotating the gap adjusting member 30 by a desired number of clicks.

Next, expansion of the maxillary skeletal expander will be described.

As shown in FIG. 8, the maxillary skeletal expander is coupled to the maxilla M by implanting the first fixing member 61 and the second fixing member 62 in the maxilla M so as to pass through the first body 10 and the second body 20.

With the maxillary skeletal expander coupled to the maxilla M, the tooth coupling member 91 is fixed to a tooth T such as a molar.

A patient who has had the maxillary expansion device applied to the maxilla M at a hospital such as a dental clinic uses the tool 100 as instructed by the clinic to periodically expand the maxillary skeletal expander by a predetermined number of clicks by himself or herself. If necessary, the patient may expand the maxillary skeletal expander while measuring an expansion length between the first body 10 and the second body 20 with a gauge (not shown).

In a state in which the extension part 122 of the tool 100 is in close contact with the first stopper 111*c*, as shown in (a) of FIG. 11, the insertion part 123 is coupled to the main body 31 of the gap adjusting member 30, as shown in (b) of FIG. 11.

In a state where the insertion part 123 of the tool part 120 is coupled to the main body 31 of the gap adjusting member 30, when the handle part 110 is pulled as shown in (c) of FIG. 11, the extension part 122 of the tool part 120, which is in close contact with the first stopper 111*c*, is rotated about the support part 121 to be caught by the second stopper 111*d*.

As such, since the tool part 120 is rotated from the first stopper 111*c* to the second stopper 111*d*, a rotational force of the tool part 120 may be delivered to the main body 31 of the gap adjusting member 30 through the insertion part 123.

For example, since the tool part 120 is limited to rotating at only 60 degrees per click, the gap adjusting member 30 may be rotated once in response to 6 clicks of the tool part 120.

As such, when the gap adjusting member 30 is rotated using the tool 100, the first body 10 and the second body 20 may expand in the expansion direction D1.

When the gap adjustment member 30 is rotated, the first body 10 moves along the first threaded portion 32 and is then unscrewed from the first threaded portion 32 at the non-threaded portion 34, thereby unable to expand any longer. In this state, even if the gap adjusting member 30 is further rotated, the first threaded portion 32 only idles with the non-threaded portion 34 inserted into the first body 10.

When the gap adjusting member 30 is rotated, the second body 20 moves along the second threaded portion 33 like the first body 10 and is then unscrewed from the second threaded portion 33 at the non-threaded portion 34, thereby unable to expand any longer. In this state, even if the gap adjusting member 30 is further rotated, the second threaded portion 33 only idles with the non-threaded portion 34 inserted into the second body 20.

As such, since the first body 10 and the second body 20 are not able to expand beyond a maximum extension range due to the non-threaded portion 34, it is possible to prevent a case where the first body 10 and the second body 20 continue to expand to be separated from the first threaded portion 32 and the second threaded portion 33 and then disassembled. Accordingly, the patient may expand the maxillary skeletal expander without feeling nervous and anxious.

As described above, in the present disclosure, as the expansion of the first body and the second body is limited by the non-threaded portions at the ends of the first threaded portion and the second threaded portions, it is possible to prevent a problem that the first body and the second body expands beyond a maximum expansion range to escape from the first threaded portion and the second threaded portion and thus disassembled.

In addition, in the present disclosure, as the anti-rotation member is provided in the anti-rotation plate and the elastic protrusion of the anti-rotation member fits into the anti-rotation recess of the main body, it is possible to prevent unintentional rotation of the gap adjusting member.

In the present disclosure, the first fixing member and the second fixing member are obliquely implanted in the maxilla in such a way that implants the first fixing member and the second fixing in a crossing direction intersecting an expansion direction close to the center of the maxilla to pass through both sides of the first and second bodies so that the first fixing member and the second fixing member become further spaced apart from each other downwards, thereby improving fixing strength to the maxilla.

In addition, in the present disclosure, it is possible for a patient to easily, accurately, and stably rotate the gap adjusting member by a desired number of clicks by using a dedicated tool for the maxillary skeletal expander.

While particular embodiments of the present disclosure have been disclosed, it is to be understood that various different modifications and combinations are possible without departing from the gist of the present disclosure by those skilled in the art. Accordingly, the exemplary embodiments described herein are merely illustrative and are not intended to limit the scope of the present disclosure. The technical idea of the present disclosure is not limited by the exemplary embodiments. The scope of protection sought by the present disclosure is defined by the appended claims and all equivalents thereof are construed to be within the true scope of the present disclosure.

What is claimed is:

1. A maxillary skeletal expander comprising:

a first body configured to be coupled to a maxilla;

a second body configured to be coupled to the maxilla, the second body opposing the first body;

a first guide pin and a second guide pin coupled to the first body and the second body so as to pass through side surfaces of the first body and the second body, each of the first body and the second body being movable along the first guide pin and the second guide pin;

a gap adjusting member including a first threaded portion and a second threaded portion respectively provided on opposite sides of a main body and respectively screwed to the first body and the second body;

a first coupling part provided between the main body and the second threaded portion; and an anti-rotation plate including:

an assembly space recessed in one surface of the anti-rotation plate, the assembly space being formed with curved inner wall surfaces and being open at a lower side such that the first coupling part is insertable into the assembly space through the lower side;

opposite end portions of the anti-rotation plate configured to be respectively inserted into coupling grooves provided in the first guide pin and the second guide pin; and an partially arch shaped anti-rotation member disposed on the one surface of the anti-rotation plate and facing the main body, the anti-rotation member including a coupling space aligned with the assembly space such that, in an assembled state, the assembly space and the coupling space together define a receiving space that surrounds the first coupling part;

wherein the anti-rotation member includes an elastic protrusion extending from an end of the partial arch shape and protruding toward the main body and configured to be inserted into an anti-rotation recess formed along an edge of one side surface of the main body, such that engagement between the elastic protrusion and the anti-rotation recess restricts unintentional rotation of the gap adjusting member.

2. The maxillary skeletal expander of claim 1, wherein the elastic protrusion includes an outer surface formed in a semicircular shape corresponding to a shape of the anti-rotation recess so as to be inserted into the anti-rotation recess.

3. The maxillary skeletal expander of claim 1, further comprising non-threaded portions at an end of the first threaded portion and an end of the second threaded portion, respectively.

4. The maxillary skeletal expander of claim 1, further comprising:

a pair of mini screws for coupling the first body or the second body to the maxilla, each of the pair of mini screws being configured to be obliquely implanted in the maxilla in a cross direction intersecting an expansion direction to be close to a central portion of the maxilla, wherein the pair of mini screws pass through both sides of the first body or both sides of the second body and become spaced apart from each other downwards.

5. The maxillary skeletal expander of claim 4, further comprising a pair of guide members respectively coupled to opposite sides of the first body or to opposite sides of the second body, each of the pair of guide members having a through hole through which one of the pair of mini screws is inserted.

6. The maxillary skeletal expander of claim 5, wherein the through hole of each of the pair of guide members is configured as a slant hole for guiding slant implantation of the one of the pair of mini screws.

7. The maxillary skeletal expander of claim 1, further comprising:

a plurality of arms coupled to an outer side of the first body and an outer side of the second body, wherein each of the plurality of arms is positioned between the first guide pin and the second guide pin and is configured to be fixed to a tooth of the maxilla.

8. The maxillary skeletal expander of claim 1, further comprising:

a second coupling part provided between the main body and the first threaded portion; and a support plate opposing the anti-rotation plate and having an assembly space configured to surround the second coupling part, wherein ends of opposite sides of the support plate are respectively inserted into the coupling grooves of the first guide pin and the second guide pin.

9. The maxillary skeletal expander of claim 1, wherein the maxillary skeletal expander includes a pair of the anti-rotation plates disposed on opposite sides of the main body, respectively, and wherein a pair of anti-rotation recesses are formed in the opposite sides of the main body, respectively, each anti-rotation recess being configured to receive the elastic protrusion of a corresponding one of the anti-rotation plates.

10. A maxillary skeletal expanding system comprising:

the maxillary skeletal expander of claim 1; and a tool configured to rotate the gap adjusting member, the rotated gap adjusting member causing expansion in an expansion direction so that the first body and the second body move away from each other.

11. The maxillary skeletal expanding system of claim 10, wherein the tool comprises:

a handle part; and a tool part comprising a support part configured to be coupled to an assembly end provided on one side of the handle part via a hinge member, an extension part extending from the support part, and an insertion part provided at a distal end of the extension part and configured to be inserted into and engaged with a prismatically structured portion of the main body of the gap adjusting member.

12. The maxillary skeletal expanding system of claim 11, the tool part further comprises:

a first assembly, into which the support part is inserted, provided in one surface of the assembly end; and a second assembly, into which the extension part is inserted while communicating with the first assembly, provided in the one surface of the assembly end, wherein the second assembly restricts rotation of the extension part.

13. The maxillary skeletal expanding system of claim 12, wherein:

the second assembly comprises a first stopper and a second stopper, and the extension part is configured to be limited to rotating at 60 degrees by the first stopper and the second stopper.

14. The maxillary skeletal expanding system of claim 12, wherein the hinge member comprises:

a head; and a hinge shaft extending from the head and having a distal end and an assembly recess formed on an outer periphery surface of the distal end.

15. The maxillary skeletal expanding system of claim 14, wherein the tool part further comprises:

an elastic body configured to be in contact with the support part and to be received by one side of the head; and a stop ring coupled to the assembly recess, wherein an end of the hinge shaft is coupled through the elastic body, the support part, and the assembly end, sequentially.

* * * * *